US005538160A

United States Patent [19]

Ziesel

[11] Patent Number: 5,538,160

[45] Date of Patent: Jul. 23, 1996

[54] POSTMIX BEVERAGE DISPENSER WITH WATER BOOST

[75] Inventor: Lawrence B. Ziesel, Marietta, Ga.

[73] Assignee: The Coca-Cola Company, Atlanta, Ga.

[21] Appl. No.: 357,948

[22] Filed: Dec. 16, 1994

[51] Int. Cl.[6] ........................ G01F 11/00

[52] U.S. Cl. ........................ 222/1; 137/119.08; 137/119.1; 222/61; 222/63; 222/64; 222/129.1; 222/385.6; 222/399

[58] Field of Search ........................ 222/1, 61, 63, 222/64, 129.1, 129.2, 129.3, 129.4, 386.15, 394, 399; 137/119

[56] References Cited

U.S. PATENT DOCUMENTS 4,139,123 2/1979 Castillo ........................ 222/129.1 X
4,275,823 6/1981 Credle, Jr. ........................ 222/64 X
4,708,266 12/1987 Rudick ........................ 222/129.1 X
4,921,134 5/1990 Aschberger et al. ........................ 222/64
5,016,664 5/1991 Cole ........................ 137/119 X
5,021,250 6/1991 Ferguson ........................ 222/129.1 X
5,383,576 1/1995 Richter et al. ........................ 222/386.5 X
5,411,179 5/1995 Oyler et al. ........................ 222/129.1

FOREIGN PATENT DOCUMENTS 8204242 12/1982 WIPO ........................ 222/386.5

*Primary Examiner*—Joseph A. Kaufman
*Attorney, Agent, or Firm*—Thomas R. Boston

[57] ABSTRACT

A water boost for a postmix beverage dispensing system in which the water pump for the carbonator is used to also pump water into the water boost tank by the use of a three-way solenoid valve and a control circuit.

4 Claims, 1 Drawing Sheet

POSTMIX BEVERAGE DISPENSER WITH WATER BOOST

BACKGROUND OF THE INVENTION

This invention relates to postmix beverage dispensers and in particular to a system for providing a pressure boost for the still (non-carbonated) water supply.

It is known to provide such a water boost by adding a separate water pump and water boost tank to the dispensing system.

The present invention provides the same advantages but at a lower cost.

SUMMARY OF THE INVENTION

A water boost for a postmix beverage dispensing system in which the water pump for the carbonator is used to also pump water into the water boost tank by means of a three-way solenoid valve and a control circuit.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENT

Figure 1:
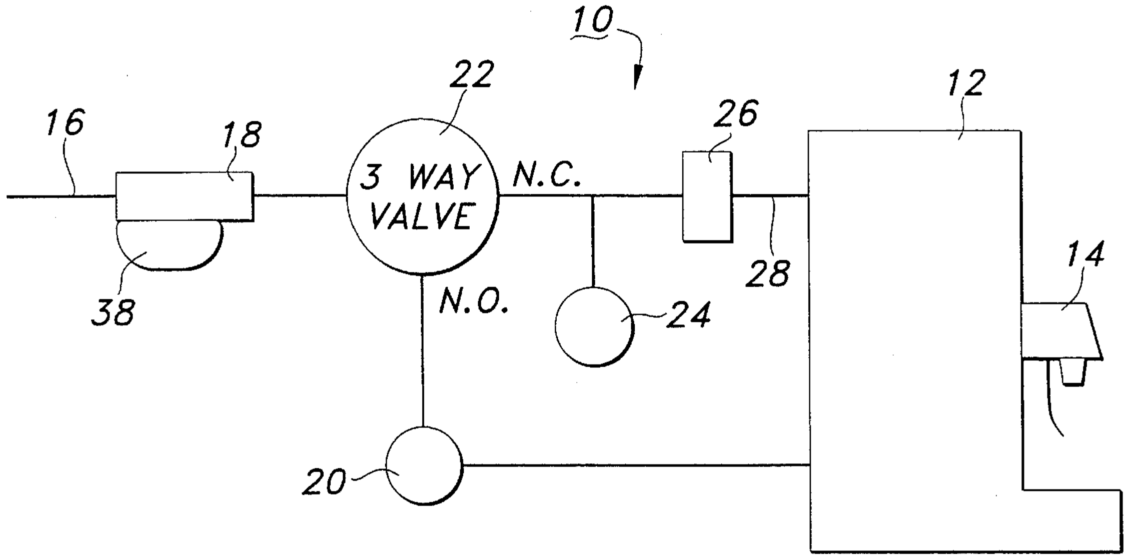
FIG. 1 is a diagrammatic illustration of the postmix beverage dispensing system, of this invention.

With reference now to the drawings, FIG. 1 shows a postmix beverage dispensing system 10 comprising a postmix beverage dispenser 12 including a plurality of dispensing faucets 14, a water inlet line 16, a water pump 18 (driven by motor 38) in the line 16, a carbonator tank 20, a three-way solenoid valve 22, an air bladder water boost tank 24, and a pressure switch 26. Line 28 feeds still water to the dispenser for any faucets using still water, and line 30 feeds carbonated water to the dispenser for any faucets using carbonated water.

The pump 18 and carbonator tank 20 can be any standard carbonator and can be inside of the dispenser or outside thereof.

Figure 2:
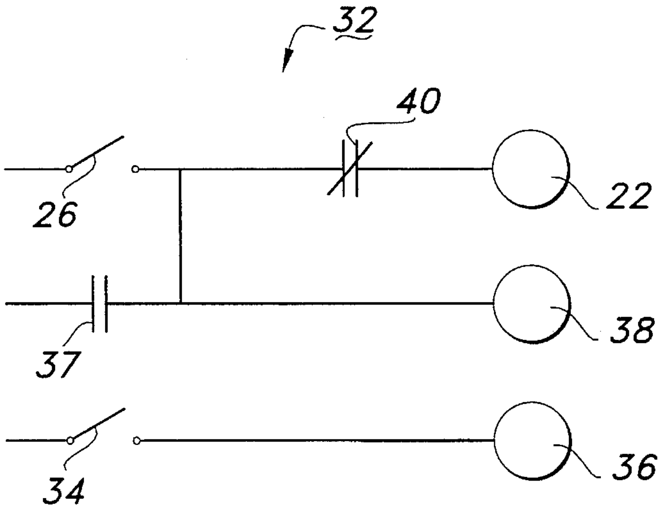
FIG. 2 is an electrical schematic of the control circuit of the present invention.

What this invention adds to the system 10 of FIG. 1 are the three-way valve 22, the water boost tank 24, the pressure switch 26, and the control circuit of FIG. 2.

FIG. 2 shows the control circuit 32 for the system 10 of FIG. 1. The circuit 32 includes a water level probe switch 34 which is part of the standard carbonator tank 20, a relay 36 energized by closing the probe switch 34, a motor 38 for operating the water pump 18, and the water pressure switch 26 shown in FIG. 1.

The three-way valve 22 is normally open between the pump 18 and the carbonator tank. When the level probe switch 34 closes (when the water level in tank 20 falls to a certain level), the relay 36 is energized to close relay contact 37 to turn on the motor 38 that drives the water pump 18 to pump water into the tank 20 until a desired higher level is reached and the switch 34 opens and turns off the pump 18; this also opens relay contact 40 to ensure that water flows from three-way valve 22 to the carbonator tank 20.

Separately, when the water pressure in line 28 drops below a predetermined value, preferably 90 psig, and the pump 18 is not pumping water into the tank 20, the carbonator pump 18 (i.e., the motor 38) is turned on and the three-way valve switches position (from its first to its second position) to allow the water to fill the bladder tank 24. After the pressure reaches a predetermined higher pressure, preferably 110 psig, the pressure switch 26 opens and the pump 18 turns off and the three-way valve 22 returns to its normal position (open between the pump and the carbonator tank).

This system 10 features carbonated water priority: that is, if both the non-carbonated and carbonated tanks call for water, the three-way valve 22 will stay (or switch into) in its first position and water will be pumped into the carbonator tank 20 until the carbonator tank is full. That is, when switch 34 is closed, relay contact 40 will be open and the three-way valve 22 cannot switch to its second position even if pressure switch 26 is closed.

Thus, this invention provides a design which converts a carbonator into a carbonator/water boost by adding in the following components: a pressure switch, a three-way valve, a bladder tank, and an electric relay (standard relief valves are also added).

While the preferred embodiment of this invention has been described above in detail, it is to be understood that variations and modifications can be made therein without departing from the spirit and scope of the present invention.

What is claimed is:

1. A postmix dispensing system including:

(a) a postmix dispenser;

(b) a water line connected to said dispenser for feeding water to said dispenser;

(c) a water pump connected in said water line;

(d) a carbonator tank and a carbonated water line connected between said carbonator tank and said dispenser for feeding carbonated water to said dispenser;

(e) an air bladder water boost tank and a still water line connected between said boost tank and said dispenser for feeding still water to said dispenser;

(f) a pressure switch for sensing the pressure of still water fed from said boost tank to said dispenser;

(g) a carbonator level switch for sensing the level of water in said carbonator;

(h) a three-way solenoid valve having an inlet port connected to said water line, a carbonator outlet port connected to said carbonator tank and a water boost tank outlet port connected to said water boost tank, said valve having a first position in which it is open between said pump and carbonator tank and closed between said pump and boost tank and a second position the reverse of the first position, said valve being normally in said first position;

(i) an electrical control circuit for switching said three-way valve from its first to its second position to feed water to said boost tank when said pressure switch senses a pressure below a predetermined value and for switching said valve back to its first position the pressure sensed by said pressure switch reaches a predetermined higher pressure, and for turning on said pump when said level switch senses a predetermined low water level in said carbonator tank to feed water thereto and for turning off said pump when said level switch senses a predetermined higher level.

2. The system as recited in claim 1 wherein said control circuit includes means for placing said valve in its first position when both of said tanks call for water thus providing carbonated-water priority.

3. A method for providing a still water boost for a postmix dispenser system including a carbonator having a water pump and a carbonator tank and a water line therebetween comprising the steps of:

(a) providing a three-way valve in said water line between said pump and said carbonator tank, said valve being normally open therebetween;

(b) providing an air bladder water boost tank in a water line from said valve to said dispenser;

(c) turning on said pump when said carbonator tank calls for water; and (d) switching said three-way valve and turning on said pump when the water pressure from said boost tank falls below a predetermined value, thereby feeding water to said boost tank.

4. The method as recited in claim 3 including positioning said three-way valve in said normally open position when both tanks call for water to prioritize water to said carbonator tank.

* * * * *